United States Patent [19]

Bermudez et al.

[11] 4,384,010

[45] May 17, 1983

[54] GRINDING AIDS FOR THE GRINDING OF CEREAL GRAINS

[75] Inventors: Mauricio Bermudez, Miami, Fla.; Richard R. Klimpel; Steven D. Sands, both of Midland, Mich.

[73] Assignee: The Dow Chemical Company, Midland, Mich.

[21] Appl. No.: 195,978

[22] Filed: Oct. 10, 1980

Related U.S. Application Data

[63] Continuation-in-part of Ser. No. 113,895, Jan. 21, 1980, abandoned.

[51] Int. Cl.$^3$ ................................................ A23L 1/00
[52] U.S. Cl. .................................... 426/618; 426/518
[58] Field of Search ............... 426/618, 622, 455, 518, 426/626, 507; 241/6–8

[56] References Cited

U.S. PATENT DOCUMENTS

| | | | |
|---|---|---|---|
| 2,413,472 | 12/1946 | Sullivan et al. | 426/518 |
| 3,252,662 | 5/1966 | Lyons et al. | 241/16 |
| 3,261,690 | 7/1966 | Wayne | 426/417 |
| 3,519,431 | 7/1970 | Wayne | 426/442 |
| 3,950,182 | 4/1976 | Steel et al. | 426/308 |

OTHER PUBLICATIONS

Winter, *A Consumer's Dictionary of Food Additives*, Crown Pub. Inc., N.Y., 1972, p. 188.
Klimpel et al., *I & EC Process Design and Development*, vol. 17, 10/78, "Chemical Grinding Aids for . . . Grinding of Ores", pp. 518–523.

*Primary Examiner*—Raymond N. Jones
*Assistant Examiner*—Elizabeth A. Hatcher

[57] ABSTRACT

The efficiency of grinding cereal grains, particularly corn, is improved by grinding the cereal grain in the presence of a hygroscopic polyhydric alcohol, e.g., propylene glycol.

10 Claims, No Drawings

GRINDING AIDS FOR THE GRINDING OF CEREAL GRAINS

CROSS-REFERENCE TO RELATED APPLICATION

This application is a continuation-in-part of our co-pending application Ser. No. 113,895, filed Jan. 21, 1980 now abandoned.

BACKGROUND OF THE INVENTION

This invention relates to a method for grinding cereal grains, particularly to methods wherein the cereal grain is ground in the presence of a hygroscopic polyhydric alcohol.

In the preparation of many food products from cereal grains, the cereal grain is often ground or milled to a suitable size in the presence of a liquid grinding medium, conventionally water or other aqueous liquid. For example, corn, which has previously been heated in an alkaline aqueous solution, e.g., calcium hydroxide solution, is often ground in a rotary shear type apparatus, e.g., hammer mill, to make a ready mix useful for preparing tortillas and other corn products.

In general, due to the inefficiencies inherent in shear type grinding operations, to obtain the desired particle size requires relatively long grinding times and outputs of significant amounts of energy. While grinding aids, e.g., silicates, phosphonates and sulfonates have been found useful in increasing the efficiency of the impact grinding of inorganic ores and fossilized mineral ores, such grinding aids have not generally been found to effectively improve the grinding of the more plastic (i.e., easily deformed) cereal grains. Specifically, relatively large amounts of such conventional grinding aids are generally required to obtain the desired grinding efficiency. In addition, since such grinding aids often deleteriously affect the subsequent processing of the ground material and are not generally approved for food usage, they must normally be separated from the ground cereal grain following grinding.

In view of the aforementioned problems associated with the prior art, it would be highly desirable to improve the efficiency of the grinding of cereal grains.

SUMMARY OF THE INVENTION

Accordingly, the present invention is a process for grinding cereal grains, said method comprising grinding the cereal grain in the presence of an aqueous grinding medium and an amount of a hygroscopic polyhydric alcohol sufficient to increase grinding efficiency.

In the novel method of this invention, the grinding efficiency, as generally evidenced by a reduction in the number average particle size of the cereal grain after grinding the grain for a predetermined length of time, is measurably increased by grinding in the presence of a hygroscopic polyhydric alcohol. As a result of this increased efficiency, the cereal grain can be ground to a desired particle size at higher feed rates or a smaller size particle can be produced at a fixed feed rate. Moreover, the hygroscopic polyhydric alcohols do not adversely affect subsequent process steps, e.g., filtration, of the ground cereal grain.

In a preferred embodiment of this invention, the cereal grain is ground in the presence of a hygroscopic polyhydric alcohol which alcohol can suitably be employed in food products thereby eliminating the need to separate the grinding aid from the ground cereal grain.

In general, food products prepared from such ground cereal grain will possess more desirable properties, e.g., increased moisture retention which results in improved workability, than food products ground using no such grinding aid.

The method of this invention is useful for grinding cereal grains, with the resulting ground cereal grains being useful in the preparation of a wide variety of food products.

DETAILED DESCRIPTION OF THE INVENTION

The term "cereal grain" is used conventionally herein and refers generally to the edible grain of the members of the grass family. Representative examples of cereals having such edible grain are wheat, e.g., hard red spring or winter wheat, durum wheat, white wheat and mixed wheat; barley; corn, e.g., yellow, white or mixed corn of the dent or flint type; oats; rice; rye, sorghum; and the like. Cereal grains preferred in the practice of this invention are corn and wheat; with corn, particularly a mixture of white corn and yellow corn, being most preferred.

In the practice of this invention, the cereal grain is ground in the presence of an aqueous liquid (hereinafter referred to as an aqueous grinding medium). The aqueous grinding medium can be water (including aqueous liquids such as alkaline or acidic aqueous solutions, e.g., an aqueous solution of calcium or sodium hydroxide, or aqueous salt solutions) or a mixture of water and a water miscible liquid, preferably a polar liquid such as a lower alkanol, e.g., methanol, ethanol or propanol; a lower ketone, e.g., acetone or methylethyl ketone; an ether, e.g., diethyl ether or diethylene glycol methyl ether; and the like.

The amount of the aqueous grinding medium employed in the practice of the present invention can vary within wide limits depending on the grinding techniques, the cereal grain and the desired particle size of the ground cereal grain. In general, the aqueous grinding medium is employed in amounts ranging from about 10 to about 100 weight percent based on the weight of the cereal grain and aqueous grinding medium wherein the weight of the cereal grain is a dry weight following removal of essentially all the water (moisture) therefrom, e.g., vacuum drying the cereal grain for 0.5 hour at 100° C. and a vacuum of 710 mm. Advantageously, the amount of the aqueous grinding medium is from about 20 to about 80, more advantageously from about 25 to about 60, weight percent based on the weight of the cereal grain and aqueous grinding medium. The method of this invention is particularly useful in the grinding of cereal grains, particularly corn, wherein the grain has been steeped or soaked in an aqueous liquid such as an alkaline aqueous solution, e.q., a calcium hydroxide solution and, optionally but generally soaked and/or rinsed with excess water prior to grinding. In such case, the aqueous grinding medium comprises that amount of liquid which remains following the filtration of the grain and excess liquid using a liquid permeable, grain impermeable screen, e.g., a screen having openings of about 1-2 mm.

As used herein, the term "hygroscopic polyhydric alcohols" (hereinafter referred to as "polyols") means water-soluble materials bearing two or more hydroxy (-OH) groups, which materials are capable of adsorbing moisture from air. By the term "water-soluble,"

which term includes miscible, is meant that the polyol forms a true solution in water, i.e., individual molecules of the polyol are dispersed in water. Advantageously, the polyols employed herein are soluble in water in an amount of at least about 1, preferably at least about 5, weight percent based on the weight of the water. Polyols which exhibit measurable water adsorption at 25° C. and 50 percent relative humidity using a conventional test method for measuring equilibrium water adsorption are presumed hygroscopic for the purposes of this invention. Such conventional method for measuring water adsorption consists of determining the weight gain, if any, experienced by the polyol in constant temperature and constant humidity air. Using such methods, the hygroscopic polyol advantageously adsorbs at least about 30, more advantageously at least 50, mg of water per g of polyol at 25° C. and 60 percent relative humidity.

The polyols advantageously employed herein are generally hydroxy-substituted, saturated aliphatic compounds including glycols such as ethylene glycol, 1,2-propylene glycol, 1,3-propylene glycol and 1,4-butylene glycol; the condensation reaction products of ethylene glycol such as diethylene glycol or tetraethylene glycol; glycerol; the condensation reaction products of glycerol such as diglycerol, hexaglycerol or decaglycerol; sorbitol and the like. Of such hydroxysubstituted, saturated aliphatics; glycol, sorbitol and the condensation reaction products of glycol are preferably employed herein. More preferably, glycols, particularly 1,2-propylene glycol or 1,3-propylene glycol are employed.

Of the hereinbefore specified polyols, those most preferably employed as grinding aids herein are suitably employed in food products, e.g., are approved by the FDA for food use. Of such materials, the glycols particularly propylene glycol, are most preferably employed herein. Using such polyols, the ground cereal grain can be employed in the preparation of food products without the prior separation of the grinding aid therefrom. Moreover, the food products prepared from a mixture of the ground cereal grain and such polyols, particularly wherein the polyol is propylene glycol, often exhibit more desirable properties than food products prepared from a ground cereal grain having no such grinding aid therein. For example, corn ground in the presence of propylene glycol exhibits improved binding, i.e., less tendency to crack on cooking and increased workability.

In the practice of this invention, the polyols are employed in amounts sufficient to increase the grinding efficiency of the cereal grains. In general, such increased grinding efficiency is evidenced by the fact that the cereal grain ground in the presence of a polyol, using conventional grinding techniques, e.g., a rotary shear type apparatus such as a hammer mill, has a number average particle size which is measurably less than the number average particle size of a cereal grain ground using identical grinding techniques except no polyol or other grinding aid is employed therewith. (See, for example, the test method set forth in Example 1.) Advantageously, the polyol is employed in an amount such that the number average particle size of a cereal grain ground using the improved method of this invention is reduced by at least about 0.5, preferably at least about 1, percent when compared to an identical cereal grain ground using identical techniques but without a grinding aid. In general, such increased grinding efficiency is evidenced by a measurable reduction in the time required for grinding a cereal grain to a predetermined particle size. Thus, the cereal grain can be ground to a desired particle size at higher feed rates or smaller size particles can be produced at a fixed feed rate by using the aforedescribed grinding aids. For example, in open cycle continuous grinding operations, increased throughput and/or reduced particle sizes at constant throughputs will be observed. Similarly, in continuous closed cycle grinding operations, wherein a portion of the cereal grain being ground is continuously recycled through the grinder until the desired size is obtained, the average residence time of the cereal grain to obtain a desired particle size will be measurably reduced.

The amount of a polyol required to measurably increase the grinding efficiency of grinding the cereal grains is dependent on a variety of factors including the grinding techniques, particularly the amounts of water; the type of cereal grain and polyol employed; and the desired increase in grinding efficiency. Typically, the polyol is employed at a concentration of at least about 0.05 weight percent based on the weight of the cereal grain and aqueous grinding medium. Advantageously, in the practice of this invention, the hygroscopic polyol is employed in an amount from about 0.1 to about 10, preferably from about 0.2 to about 5, more preferably from about 0.5 to about 3, weight percent polyol based on the weight of the cereal grain and aqueous grinding medium.

In the practice of this invention, the cereal grain, aqueous grinding medium and polyol are mixed and the resulting mixture ground using conventional grinding techniques. While the method of combining, i.e., mixing, the grinding aid with the cereal grain is not critical, advantageously, the grinding aid is added to the mixture of the cereal grain and aqueous grinding medium. In continuous closed cycle grinding operations, the polyol is advantageously added to the portion of ground grain being recycled through the grinder.

Grinding techniques useful herein are well known in the art and reference is made thereto for the purposes of this invention. In general, both shear type mills, e.g., hammer mills and knife grinders, and impact type mills such as tumbling media mills, e.g., ball mill or autogenous mills can also be employed herein. The cereal grains are advantageously ground using a shear type mill, preferably a hammer mill or knife grinder with a hammer mill being most preferred.

The following examples are incorporated to illustrate the practice of this invention and should not be construed to limit its scope or application. In the example, all parts and percentages are by weight unless otherwise indicated.

EXAMPLE 1

A 135 part portion of white corn is cooked in an aqueous solution of 0.8 percent calcium hydroxide and heated to boiling for a period of about 12 minutes. Similarly, a 57 part portion of yellow corn is cooked in an aqueous calcium hydroxide solution (0.8 percent) for 7 minutes. After cooking, the calcium hydroxide is drained from each corn portion. Each portion is subsequently rinsed with excess amounts of water and then soaked in water at ambient temperatures, i.e., between about 15° to about 25° C., for a 10 minute period. The rinse water is then drained from the corn. The portions of the resulting cooked, whole grain corn are mixed.

The resulting mixture contains about 40 percent water which water serves as the aqueous grinding medium.

To a 100 part portion of the resulting wet, whole grain corn is added 50 parts of a ground corn (70 percent white, 30 percent yellow with a moisture content of about 10 percent) having a particle size of from about 0.6 mm to about 2 mm and a number average particle size of about 1.2 mm and 1 part of propylene glycol. The resulting mixture of the water wet cooked, whole grain corn; ground corn; and grinding aid is designated Sample No. 1.

As a control, a mixture (Sample No. C) having no grinding aid therein is prepared from 100 parts of the water wet, cooked, whole grain corn and 50 parts of the ground corn.

Each of the resulting mixtures is separately ground for 30 seconds on a hammer mill having 3 pivotally mounted hammers (impeller bars) operated at a speed of about 3600 rpm. The number average particle size of each sample of ground corn and the percentage of the ground corn having a particle size greater than 2 mm are determined using conventional screening techniques. These results are recorded in Table I.

TABLE I

| Sample No. | Grinding Aid Type | Conc.[1] | Particle Size, mm[2] | Particles of Size >2 mm, %[3] |
|---|---|---|---|---|
| C* | — | — | 1.563 | 39.1 |
| 1 | Propylene Glycol | 1 | 1.494 | 33.4 |

*Not an example of this invention.
[1] Concentration of the grinding aid expressed is the weight percent of the grinding aid based on the dry weight of the cooked, whole grain corn.
[2] Particle size is the number average particle size of the corn (cooked, whole grain corn and dry, ground corn).
[3] The weight percent of total corn (cooked, whole grain corn and dry, ground corn) having a particle size greater than 2 mm.

As evidenced by the data in Table I which shows that corn ground in the presence of a propylene glycol has a smaller number average particle size and that less of such ground corn has a particle size of greater than 2 mm, the hygroscopic polyol is shown to be effective as a grinding aid in the grinding of cereal grains.

What is claimed is:

1. A method for grinding cereal grains, the method comprising grinding the cereal grain in the presence of an aqueous grinding medium and an amount of a hygroscopic polyhydric alcohol sufficient to increase the grinding efficiency said aqueous grinding medium being employed in an amount ranging from about 10 to about 100 weight percent based on the weight of the cereal grain and aqueous grinding medium.

2. The method of claim 1 wherein the hygroscopic polyhydric alcohol is a hydroxy-substituted, saturated aliphatic.

3. The method of claim 1 wherein the hygroscopic polyhydric alcohol is a glycol and a condensation reaction product of a glycol or sorbitol.

4. The method of claim 3 wherein the hygroscopic polyhydric alcohol is propylene glycol or sorbitol.

5. The method of claim 1 wherein the cereal grain is corn.

6. The method of claim 1 wherein the aqueous grinding medium is employed in amounts of from about 10 to about 80 weight percent based on the weight of the cereal grain and aqueous grinding medium.

7. The method of claim 6 wherein the cereal grain is corn, the aqueous grinding medium is employed in an amount from about 25 to about 60 weight percent based on the weight of the cereal grain and grinding medium, the hygroscopic polyhydric alcohol is propylene glycol or sorbitol, said alcohol being employed in an amount from about 0.1 to about 10 weight percent based on the weight of the cereal grain and aqueous grinding medium.

8. The method of claim 7 wherein the grinding is conducted using a rotary shear type mill.

9. The method of claim 8 wherein the hygroscopic polyhydric alcohol is propylene glycol and is employed in an amount from about 0.2 to about 5 weight percent based on the weight of the cereal grain and aqueous grinding medium and the grinding is conducted using a hammer mill.

10. The method of claim 1 wherein the hygroscopic polyhydric alcohol being employed is from about 0.1 to about 10 weight percent, based on the weight of the aqueous grinding medium and cereal grain.

* * * * *